United States Patent [19]
Jefferies

[11] 4,081,239
[45] Mar. 28, 1978

[54] STORAGE STABLE CONCENTRATED AQUEOUS SOLUTIONS OF AMINOMETHYLATED PHTHALOCYANINES

[75] Inventor: Patrick Joseph Jefferies, Fort Mitchell, Ky.

[73] Assignee: Sterling Drug Inc., New York, N.Y.

[21] Appl. No.: 712,175

[22] Filed: Aug. 6, 1976

[51] Int. Cl.² .............................................. C09B 47/04
[52] U.S. Cl. ..................................... 8/1 XA; 260/314.5
[58] Field of Search ...................... 260/314.5; 8/1 XA

[56] References Cited
U.S. PATENT DOCUMENTS 3,954,796  5/1976  Kuster ................................ 260/314.5

FOREIGN PATENT DOCUMENTS 1,241,143  7/1971  United Kingdom .............. 260/314.5

OTHER PUBLICATIONS

Diserens et al, Chemical Technology of Dyeing and Printing, pp. 8 to 9, Reinhold Publishing Corp. (1948).

Primary Examiner—Richard L. Raymond
Attorney, Agent, or Firm—Lynn T. Fletcher; B. Woodrow Wyatt

[57] ABSTRACT

Storage-stable aqueous compositions containing dissolved water-soluble methanesulfonic acid addition salts or mixed methanesulfonic acid-hydrochloric acid addition salts of poly(aminomethylated) metal phthalocyanines, which are prepared by the interaction of methanesulfonic acid and poly(aminomethylated) metal phthalocyanines, are useful for direct dyeing, particularly the dyeing of cellulose.

8 Claims, No Drawings

STORAGE STABLE CONCENTRATED AQUEOUS SOLUTIONS OF AMINOMETHYLATED PHTHALOCYANINES

BACKGROUND OF THE INVENTION

(a) Field of the Invention

This invention relates to the field of chemistry and more particularly to novel water-soluble methanesulfonic acid addition salts and to mixed methanesulfonic acid-hydrochloric acid addition salts of poly(aminomethylated) metal phthalocyanine dyestuffs useful as direct dyes, particularly in the dyeing of cellulose; to processes for their preparation; to storage-stable concentrated aqueous dye compositions prepared therefrom; and to processes for preparing said storage-stable concentrated aqueous dye solutions.

(b) Description of the Prior Art

United States Pat. No. 2,761,868 discloses green and blue basic dyestuffs of the phthalocyanine series bearing from one to eight aminomethyl groups and specific acid addition salts thereof, in particular, the hydrochloride and acetate.

U.S. Pat. No. 3,632,289 discloses storage-stable concentrated solutions of up to 45 weight percent of 4,4'-bis(diethylamino)benzophenonimine hydrochloride in a mixture of 60-90 weight percent ethylene glycol and 10-40 weight percent urea and processes thereto.

U.S. Pat. No. 3,565,570 discloses a composition suitable for dyeing paper comprising an aqueous solution containing 20 to 50 percent by weight of dissolved copper phthalocyanine-bis,tris(methylene trimethylammonium) halides.

SUMMARY OF THE INVENTION

In one of its composition of matter aspects, the invention relates to storage-stable dye compositions comprising aqueous solutions of methanesulfonic acid addition salts or of mixed methanesulfonic acid-hydrochloric acid addition salts of poly(aminomethylated) metal phthalocyanines.

In a second composition of matter aspect, the invention relates to methanesulfonic acid addition salts and to mixed methanesulfonic acid-hydrochloric acid addition salts of poly(aminomethylated) metal phthalocyanines.

In one of its process aspects, the invention relates to a process for preparing storage-stable aqueous dye solutions which comprises dissolving methanesulfonic acid addition salts or mixed methanesulfonic acid-hydrochloric acid addition salts of poly(aminomethylated) metal phthalocyanines in a mixture of a glycol and water.

In a second of its process aspects, the invention relates to a process for preparing storage-stable aqueous dye solutions which comprises interacting methanesulfonic acid with poly(aminomethylated) metal phthalocyanines or the hydrochloric acid addition salts thereof in a mixture of a glycol and water.

In a third process aspect, the invention relates to a process for preparing the methanesulfonic acid addition salts or the mixed methanesulfonic acid-hydrochloric acid addition salts of poly(aminomethylated) metal phthalocyanines which comprises interacting methanesulfonic acid with poly(aminomethylated) metal phthalocyanines or with hydrochloric acid addition salts of poly(aminomethylated) phthalocyanines, respectively.

DETAILED DESCRIPTION INCLUSIVE OF THE PREFERRED EMBODIMENTS

More specifically, this invention, in the first of its composition of matter aspects, resides in novel storage-stable dye compositions comprising concentrated, free-flowing, aqueous solutions containing by weight of the entire composition: (a) as the dye constituent approximately 10 to approximately 40 percent of dissolved methanesulfonic acid addition salts or mixed methanesulfonic acid-hydrochloric acid addition salts of metal phthalocyanines selected from the group consisting of copper phthalocyanines, zinc phthalocyanines and cobalt phthalocyanines, said phthalocyanines having at least two and not more than six aminomethyl substituents, from zero to two phthalimidomethyl substituents, zero to one sulfonic acid substituent, zero to two complexed hydrochloric acid molecules and two to six complexed methanesulfonic acid molecules; (b) approximately 5 to approximately 20 percent of a glycol selected from the group consisting of ethylene glycol, propylene glycol, diethylene glycol and diethylene glycol monoethyl ether; and (c) approximately 85 to approximately 40 percent of water.

In a first particular embodiment in accordance with the first of its composition of matter aspects, the invention sought to be patented resides in novel storage-stable dye compositions containing by weight of the entire composition: as the dye constituent approximately 23 to approximately 28 percent of dissolved methanesulfonic acid addition salts or mixed methanesulfonic acid-hydrochloric acid addition salts of copper phthalocyanines having three to five aminomethyl substituents, one to two phthalimidomethyl substituents, 0.2 to 0.5 sulfonic acid substituent, zero to two complexed hydrochloric acid molecules and two to five complexed methanesulfonic acid molecules; approximately 5 to approximately 10 percent of ethylene glycol; and approximately 72 to approximately 62 percent of water.

In a second particular embodiment in accordance with the first of its composition of matter aspects, the invention sought to be patented resides in novel storage-stable dye compositions containing by weight of the entire composition: as the dye constituent approximately 23 to approximately 28 percent of dissolved methanesulfonic acid addition salts or mixed methanesulfonic acid-hydrochloric acid addition salts of zinc phthalocyanines having three to five aminomethyl sub-stituents, one to two phthalimidomethyl substituents, 0.2 to 0.5 sulfonic acid substituent, zero to two complexed hydrochloric acid molecules and two to five complexed methanesulfonic acid molecules; approximately 5 to approximately 10 percent of ethylene glycol; and approximately 72 to approximately 62 percent of water.

In a second composition of matter aspect, the invention sought to be patented resides in novel methanesulfonic acid addition salts and in mixed methanesulfonic acid-hydrochloric acid addition salts of metal phthalocyanines selected from the group consisting of copper phthalocyanines, zinc phthalocyanines and cobalt phthalocyanines, said metal phthalocyanines having at least two and not more than six aminomethyl substituents, from zero to two phthalimidomethyl substituents, zero to one sulfonic acid substituent, zero to two complexed hydrochloric acid molecules and two to six complexed methanesulfonic acid molecules.

In a first particular embodiment in accordance with the second of its composition of matter aspects, the invention sought to be patented resides in novel methanesulfonic acid addition salts and in mixed methanesulfonic acid-hydrochloric acid addition salts of copper phthalocyanines having three to five aminomethyl substituents, one to two phthalimidomethyl substituents, 0.2 to 0.5 sulfonic acid substituent, zero to two complexed hydrochloric acid molecules and two to five complexed methanesulfonic acid molecules.

In a second particular embodiment in accordance with the second of its composition of matter aspects, the invention sought to be patented resides in methanesulfonic acid addition salts and in mixed methanesulfonic acid-hydrochloric acid addition salts of zinc phthalocyanines having three to five aminomethyl substituents, one to two phthalimidomethyl substituents, 0.2 to 0.5 sulfonic acid substituent, zero to two complexed hydrochloric acid molecules, and two to five complexed methanesulfonic acid molecules.

In one of its process aspects, the invention sought to be patented resides in the process for preparing storage-stable dye compositions which comprises dissolving by weight of the entire composition approximately 10 to approximately 40 percent of methanesulfonic acid addition salts or of mixed methanesulfonic acid-hydrochloric acid addition salts of metal phthalocyanines selected from the group consisting of copper phthalocyanine, zinc phthalocyanine and cobalt phthalocyanine, said phthalocyanine having at least two and not more than six aminomethyl substituents, from zero to two phthalimidomethyl substituents, zero to one sulfonic acid substituent, zero to two complexed hydrochloric acid molecules and two to six complexed methanesulfonic acid molecules in a mixture consisting essentially by weight of the entire solution of approximately 5 to approximately 20 percent of a glycol selected from the group consisting of ethylene glycol, propylene glycol, diethylene glycol and diethylene glycol monoethyl ether, and approximately 85 to approximately 40 percent of water.

In a second process aspect, the invention sought to be patented resides in the process for preparing storage-stable aqueous dye compositions containing methanesulfonic acid addition salts or mixed methanesulfonic acid-hydrochloric acid addition salts of poly(aminomethylated) metal phthalocyanines which comprises interacting approximately two to six molecular equivalents of methanesulfonic acid with approximately one molecular equivalent of metal phthalocyanines having at least two and not more than six aminomethyl substituents, from zero to two phthalimidomethyl substituents, zero to one sulphonic acid substituent and zero to two complexed hydrochloric acid substituents in a mixture of water and a glycol chosen from the group consisting of ethylene glycol, propylene glycol, diethylene glycol diethylene glycol monoethyl ether, said components being used in appropriate quantities to produce by weight of the entire composition approximately 10 to approximately 40 percent of the dye constituent, approximately 5 to approximately 20 percent of the glycol and approximately 85 to approximately 40 percent of water.

In a third process aspect, the invention sought to be patented resides in the process for preparing methanesulfonic acid addition salts or mixed methanesulfonic acid-hydrochloric acid addition salts of poly(aminomethylated) metal phthalocyanines which comprises interacting approximately two to six molecular equivalents of methanesulfonic acid with approximately one molecular equivalent of metal phthalocyanines having at least two and not more than six aminomethyl substituents, from zero to two phthalimidomethyl substituents, zero to one sulphonic acid substituent and zero to two complexed hydrochloric acid substituents.

The term "phthalocyanine" is used herein in the generic sense to mean the class of tetraazoporphins in which each of four pyrrole nuclei is fused to an aromatic nucleus, e.g. that of benzene. Phthalocyanine itself (tetrabenzotetraazoporphin) is a well-known example of the class, and the prefixed term "metal" means that the phthalocyanine contains a metal in complex combination, for example, copper, cobalt, zinc and the like.

The terms "complexed hydrochloric acid molecule" and "complexed methanesulfonic acid molecule" are used herein to mean that the hydrochloric acid and the methanesulfonic acid are present in the dyestuff molecule in the form of acid-addition adducts. It will, of course, be understood that the precise type of bonding will depend on the condition in which the dyestuff molecule exists, that is, as a discrete solid or dissolved in solution. Thus, in the former, it would be expected that acidic materials would be bound by quaternization of the aminomethyl substituents while in the latter, it would be expected although the aminomethyl substituents would also be predominately in the quaternized form, some dissociation is possible in such an "acid-base" system.

It is well known by those skilled in the art of phthalocyanine chemistry that synthetic processes for substitution of phthalocyanine molecules almost invariably produce mixtures of substituted products rather than a single product having a specified number of substituents. This is, of course, the case with the instant compounds. The procedures taught in U.S. Pat. No. 2,761,868, which have been followed to produce the requisite poly(aminomethylated) metal phthalocyanine dyestuff intermediates herein, as would be expected, have been found to produce mixtures of substituted phthalocyanine molecules. Accordingly, the terms "two and not more than six", "zero to two", "zero to one", "two to six", "0.2 to 0.5", "three to five", "two to five" and the like adopted in the claims and in the disclosure to describe the number of phthalimidomethyl, aminomethyl and sulfonic acid substituents on the subject phthalocyanines as well as the number of complexed hydrochloric acid and complexed methanesulfonic acid molecules means the average number of said substituents or molecules per molecule of phthalocyanine. The meaning of the terms is particularly illustrated with regard to the sulfonic acid substituents which are introduced into the phthalocyanine during the preparation of the phthalimidomethyl-substituted starting materials and are retained in the final products. It is obvious that there cannot be 0.2 of a sulfonic acid substituent on the phthalocyanine molecule. This figure is, of course, and average value which results from the presence in the mixture of phthalocyanine molecules having either zero or one sulfonic acid substituent.

The novel dye constituents of this invention are water-soluble methanesulfonic acid addition salts and mixed methanesulfonic acid-hydrochloric acid addition salts of poly(aminomethylated) metal phthalocyanines obtained by the interaction of water-insoluble poly(aminomethylated) metal phthalocyanine dyestuffs, which have from zero to two complexed hydrochloric acid molecules, with methanesulfonic acid. Another aspect of this invention is the storage-stable concentrated aqueous solutions prepared from the aforesaid methanesulfonic acid addition and mixed methanesulfonic acid-hydrochloric acid addition salts.

The instant novel methanesulfonic acid addition salt and mixed methanesulfonic acid-hydrochloric acid addition salt forms of the poly(aminomethylated) metal phthalocyanine dyestuffs provide shades of turquoise. They have valuable properties as water-soluble direct dyes useful in the dyeing art for coloring natural fibers, synthetic fiber-forming materials and cellulose materials such as threads, sheets, fibers, filaments, textile fabrics and the like as well as in the manufacture of paper, varnishes, inks, coatings and plastics.

The new water-soluble methanesulfonic acid addition salts and mixed methanesulfonic acid-hydrochloric acid addition salts of this invention can be applied to natural fibers, to fiber-forming synthetic materials and to cellulose materials by methods conventional in the dyeing art. It has been found that the dyestuffs of this invention are substantive to cellulose, sized or unsized, cotton, wool and many synthetic fibers, for example, nylon and dacron. The dyed products thus obtained are stable to ultraviolet light and to washing.

The methanesulfonic acid addition salt and mixed methanesulfonic acid-hydrochloric acid addition salt forms can be isolated from the aqueous solution in which they are formed by techniques well known in the art, for example, by salting out, precipitation or concentration by evaporation. However, the water-soluble dyes thus formed are readily utilized in the form of aqueous solutions for many of their applications, particularly for dyeing cellulose. Accordingly, it is particularly preferred to retain the dyes in a concentrated aqueous solution of the type regularly employed in the paper industry for dyeing paper products.

The water-soluble methanesulfonic acid addition salt and mixed methanesulfonic acid-hydrochloric acid addition salt forms of the dyestuffs are especially valuable dyes for imparting stable turquoise blue shades to paper both sized and unsized. For use in the paper trade, the novel acid addition salt forms of this invention have several outstanding advantages over some other known acid-addition salt forms of the same dyestuffs taught in the prior art. The high degree of water-solubility of the subject acid addition salt forms makes them particularly suitable for the preparation of liquid dye concentrates which are preferred in the paper industry for several reasons. The use of concentrated aqueous solutions is particularly advantageous in view of the increasing trend toward automation, since these solutions are conveniently handled and added to the pulp slurry in accurately measured amounts by means of pump and meters. The subject aqueous dye concentrates are particularly suited to metered dyeing operations because they have low viscosity which remains essentially unchanged over long periods under ordinary storage conditions. Their low viscosity provides another advantage in that they dissolve readily in the pulp slurry and prevent specking or blotching seen when more viscous dye concentrates are used. A further advantage of the concentrated aqueous solutions is that of convenience in shipping and handling. In shipping and in use, the high degree of solubility of the methanesulfonic acid addition salts and the mixed methanesulfonic acid-hydrochloric acid addition salts permit handling of solutions containing a higher dye content and results in a desirable decrease in the weight and volume of solution per amount of dye. Furthermore, the concentrated aqueous dye solutions are more convenient for the paper mills in that the handling of dry dye, with the concomitant dusting and caking problems associated with dissolving the dye prior to its addition to the pulp slurry, are eliminated.

The novel acid-addition salt-containing concentrated dye solutions of this invention have been found to have superior storage stability characteristics compared to those of concentrated dye solutions containing other acid addition salts of aminomethylated metal phthalocyanines known in the prior art. In storage conditions similar to the type usually encountered in the paper industry, the novel methanesulfonic acid addition salt- and mixed methanesulfonic acid-hydrochloric acid addition salt-containing solutions of this invention showed either no or very minimal increase in viscosity.

The subject dyes are highly resistant to "bleed" when paper impregnated therewith is wet and placed in contact with moist white paper. This is a particularly desirable property for dyes designed for coloring paper to be used in facial tissues, napkins and the like wherein it can be foreseen that the colored paper, wetted with common household liquids such as water, soap solutions, milk, carbonated beverages, and so forth, may come in contact with other surfaces, such as textiles, paper and the like which should be protected from stain. Another advantageous property of these new water-soluble dyes for use in the paper trade is found in their high degree of color discharge when bleached with hypochlorite or "chlorine" bleach. This property of dyes is particularly desired by paper makers in order that dyed paper may be completely bleached prior to reprocessing. Still another advantageous property of the water-soluble dyestuffs of this invention is found in their high resistance to a change of shade when used to color cellulosic materials, which have either previously been treated with or are treated subsequent to dyeings, with wet-strength resin.

We have also found that the dyes of this invention have a high degree of substantivity for bleached fiber such as is used in most colored disposable paper products. Moreover, they are absorbed by cellulosic fibers from aqueous solutions at a very rapid rate. These properties are advantageous to the paper industry, because it allows the dye to be added to the pulp shortly before formation of the sheet.

The best mode contemplated by the inventor of carrying out this invention will now be described as to enable any person skilled in the art to which it pertains to make and use the same.

The novel acid addition salts of this invention are prepared by adding approximately two to six molecular equivalents of methanesulfonic acid slowly to an aqueous suspension of approximately one molecular equivalent of poly(aminomethylated) metal phthalocyanines having zero to two complexed hydrogen chloride molecules. The methanesulfonic acid addition salts and mixed methanesulfonic acid-hydrochloric acid addition salts are readily isolated by various conventional means, for example, by evaporation of the solvent, by salting-out or by the addition of a miscible non-solvent, for example, a short chain aliphatic alcohol.

The storage-stable concentrated dye compositions of this invention are prepared by dissolving approximately 10 to approximately 40 percent by weight of the entire composition of the isolated methanesulfonic acid addition salts or mixed methanesulfonic acid-hydrochloric acid addition salts in water with the subsequent addition of approximately 5 to approximately 20 percent by weight of the entire composition of a glycol or in mixtures of water and of a said amount of the glycol. Alternatively, a concentrated dye composition of this invention may be directly obtained without isolation of the dye constituent by incorporating a glycol into the aqueous reaction solution either prior to or after interaction of the poly(aminomethylated) metal phthalocyanines having zero to two complexed hydrochloric acid molecules with the methanesulfonic acid. It is particularly preferred to carry out the reaction in a glycol-water medium.

The requisite poly(aminomethylated) metal phthalocyanine dyestuff intermediates are known compounds readily obtained by the procedures taught in U.S. Pat. No. 2,761,868. Thus, one molecular equivalent of a metal phthalocyanine, for example, copper phthalocyanine, is interacted with one molecular equivalent each of paraformaldehyde and phthalimide for each aminomethylated substituent desired in the final product. The reaction is carried out in a dehydrating solvent, for example, oleum to obtain the desired poly(phthalimidomethyl) copper phthalocyanine. The poly(phthalimidomethyl) compound is then hydrolyzed in a first step in an alkaline solution, for example, sodium hydroxide solution and then in a second step in an acid solution, for example, hydrochloric acid or methanesulfonic acid to obtain the poly(aminomethylated) copper phthalocyanine as the poly(hydrochloric acid or methanesulfonic acid) addition salt. When the hydrolysis is carried out with hydrochloric acid, the product is isolated for subsequent interaction with methanesulfonic acid by the gradual addition of an alkali, for example, sodium hydroxide or ammonium hydroxide to the acid hydrolysis solution until a pH of approximately 6.5 to 6.8 is achieved and the separated dye is then collected by filtration. Elemental analyses establishes that the product isolated in this manner is a mixture of copper phthalocyanines having an average per molecule of from two to six but predominately approximately four aminomethyl substituents, from one to two phthalimidomethyl substituents, from zero to one sulfonic acid substituent, and from approximately one to approximately two complexed hydrochloric acid molecules. The product thus obtained is used in the preparation of the mixed methanesulfonic acid-hydrochloric acid addition salts and storage-stable dye compositions prepared therefrom described in the examples hereinbelow.

The following examples set forth the methods of preparation of the methanesulfonic acid addition salts and mixed methanesulfonic acid-hydrochloric acid addition salts of the poly(aminomethylated) metal phthalocyanines of this invention and the storage-stable aqueous dye compositions prepared therefrom. The examples also illustrate by comparison with other prior art salt forms of poly(aminomethylated) metal phthalocyanines, the superiority of the salt forms of this invention. All percentages of the constituents of the dye compositions given in the following examples are by weight.

EXAMPLE 1

A. By interacting copper phthalocyanine, phthalimide and paraformaldehyde in 100 percent sulfuric acid plus oleum according to the procedure described in U.S. Pat. No. 2,761,868, there was obtained copper phthalocyanine having an average per molecule of approximately five phthalimidomethyl substituents.

B. A stirred slurry of 936 g of the thus obtained penta(phthalimidomethyl) copper phthalocyanine in 4.5 liters of water was warmed to about 40° C and to the slurry there was added 250 ml of 50 percent aqueous sodium hydroxide solution. The temperature was gradually raised to 80° C and held at that temperature for one hour. In a separate flask, a mixture of 1390 ml of concentrated hydrochloric acid and 1740 ml of water was heated to refluxing temperature. The alkaline solution was then poured into the hot acid solution at such a rate as to maintain the temperature above 95° C. After the addition was complete, the mixture was heated at reflux for three hours and was then allowed to cool to ambient temperature with stirring. After stirring overnight at room temperature, the pH was gradually adjusted from an initial pH of 0.7 to pH 6.8 by the dropwise addition of 1210 ml of concentrated ammonium hydroxide. The mixture was stirred for fifteen minutes longer and the suspended solid collected by filtration. The product was air-dried to obtain copper phthalocyanine which on the basis of elemental analyses was found to have an average per molecule of approximately four aminomethyl substituents, approximately one phthalimidomethyl substituent, approximately 0.2 sulfonic acid substituent and approximately one complexed hydrochloric acid molecule.

C. To a mixture of 430 g of the product from part B above and 1 liter of water, there was slowly added 35 g of 95 percent methanesulfonic acid with stirring. After being stirred at ambient temperature for approximately ninety minutes, the resultant mixture had a pH of 1.6. An additional 34.5 g of 95 percent methanesulfonic acid was added lowering the pH to 0.7. The resulting solution was stirred overnight at room temperature after which 2250 ml of isopropyl alcohol was added to precipitate the acid-addition salt. The resulting dark blue solid was collected by filtration, washed with 1 liter of fresh isopropyl alcohol and dried in vacuo at 35° C to obtain 173.0 g of the mixed methanesulfonic acid-hydrochloric acid addition salts of predominately tetra(aminomethylated) copper phthalocyanine. Elemental analyses established that this product has an average per molecule of approximately four aminomethyl substituents, approximately one phthalimidomethyl substituent, approximately 0.2 sulfonic acid substituent, approximately one complexed hydrochloric acid molecule and approximately three complexed methanesulfonic acid molecules. The visible absorption spectrum of an aqueous solution of this dyestuff containing 0.025 g of dye per liter of solution showed a maximum at 627 millimicrons, A = 1.1528.

EXAMPLE 2

To a stirred solution of 120.0 ml of water and 9.0 ml of ethylene glycol in a beaker at 25° C, there was gradually added 48.7 g of the mixed methanesulfonic acid-hydrochloric acid addition salts of the predominately tetra(aminomethylated) copper phthalocyanine obtained in Example 1, part C above. After stirring for approximately seventeen hours at room temperature, the resulting deep blue solution was assayed by spectrophotometric means and found to contain 29.1 percent by weight of the entire composition of the dissolved dye constituent. The concentrated dye solution thus obtained was diluted with water to a final dye constituent content of 25.1 percent by weight of the entire composition. The viscosity of this concentrated dye solution measured at 25° C on a Brookfield Model LVT viscometer with a number three spindle at 30 revolutions per minute was 10 centipoises. A portion of the solution was then concentrated by evaporation to a dye constituent content of 33.9 percent by weight of the entire composition. This concentrate, containing approximately 7.0 percent ethylene glycol and approximately 59.1 percent water, each by weight of the entire composition, had a viscosity of 110 centipoises.

Sized and unsized paper dyed with aqueous dilutions of this concentrate, according to the procedure described below, had a turquoise shade and was found to be highly bleachable, in the bleach test described below. The dye was also found to produce no bleed in the water-bleed test and to bleed only very slightly in the soap-bleed test when tested in accord with the procedures described below.

The storage-stability of the concentrated dye solution obtained directly above was evaluated by comparing its initial viscosity with that obtained after subjecting the solution to five temperature variation cycles. Each cycle consisted of heating the solution in a closed container in a hot-air oven at 120° F for a period of sixteen hours and then setting the solution aside at room temperature (72°-77° F) for eight hours. Each cycle approximates storage of the concentrated solution at 75° F for a period of 22 days. After five cycles, which approximates almost four months of ordinary storage conditions, the aged concentrated solution had the same viscosity, 110 centipoises, as the freshly prepared composition.

Dyeing Procedure

A. Absorbent Paper Grades:

A 0.1 percent stock dye solution was prepared by diluting 2.95 g of the concentrated dye solution containing mixed methanesulfonic acid-hydrochloric acid addition salts of predominately tetra(aminomethylated) copper phthalocyanine prepared in Example 2 above to one liter volume with distilled water. With stirring 30 ml of the 0.1 percent dye solution was added to 100 g of a 3 percent consistency bleached kraft pulp (600 Canadian Standard Freeness). Agitation was continued for approximately fifteen minutes prior to dilution with water to a volume of four liters with agitation. The dyed pulp was then formed into an 8 by 8 inch square of paper by means of a filter-box. The paper sheet was pressed between two blotters and then dried at 180° F for 4 minutes between two fresh dry blotters to yield a uniformly dyed turquoise paper sheet.

B. Sized Paper Grades:

With stirring 30 ml of the 0.1 percent stock dye solution was added to 100 g of a 3 percent consistency bleached kraft pulp (600 Canadian Standard Freeness). After approximately 3 minutes of stirring 5.0 g of a 1.2 percent pale rosin in water emulsion was added. Agitation was continued for an additional 3 minutes at which time 5.0 g of a 1.5 percent water solution of papermaker's alum was added. Stirring was continued for approximately fifteen minutes before it was diluted to 4 liters with water and the pH adjusted to 5.0 with dilute sulfuric acid. The dyed fiber slurry was drawn into an 8 by 8 inch square of paper and dried as described in part A above.

Testing Procedures

The following test procedures were employed to determine the resistance of the dyestuffs to bleed in moist paper, bleed from paper in the presence of soap, and to bleaching with hypochlorite bleach.

Water "Bleed" Test

This procedure is a modification of the AATCC Standard Test Method 15-1962, "Colorfastness to Perspiration".

Test pieces consisting of four plies, each one inch square, are cut from the dyed paper to be tested. One or more dyed papers of known dye migration quality are included in the test series as standards.

The absorbent material consists of filter paper having a relatively smooth finish (Whatman No. 1, 4.25 cm. dia. equivalent). In addition, smooth, flat, glass or clear plastic plates of adequate stiffness, measuring 2 inches wide and 3 inches long, are required as separating plates. A 1000 gram weight serves as a dead weight loading.

Four filter paper absorbent pieces are used for each dyed paper test square, two for each side.

The migration test "sandwich" is constructed as follows. A separating plate is placed on a horizontal support and two pieces of the filter paper placed centrally on this plate with the smoother side up. The square dyed paper test pieces, held by tweezers, are immersed in tap water at room temperature for 5 seconds, drained for 5 seconds, and immediately centered on the filter paper. Immediately, two pieces of filter paper are centered on the test square and followed at once by another separating plate. This "sandwich" is pressed for a moment with the fingers, after which, without delay, a piece of filter paper is positioned on the top separating plate as before to receive a second test square of wetted dyed paper. The above procedure is then repeated as rapidly as possible and without interruption, stacking one "sandwich" on the other, until all dyed paper test pieces have been put under test.

As soon as a stack is completed, a 1000 gram weight is centered on the top separating plate. The stack is allowed to stand at room temperature (75° F) for 15 minutes.

At the end of the migration period, the stack is disassembled, and each dyed paper test square and its filter paper absorbents clipped to a supporting card. A separate card is used for each test square. The dyed paper test squares and filter papers are air dried at room temperature for at least two hours (in the dark) before ranking. Relative degrees of dye migration, as compared to that from standard samples, are determined by visual ratings, in daylight, of the intensity of dye stain on the filter paper surfaces which had been in contact with the test square.

SOAP BLEED TEST

This procedure utilizes the same method employed in the Water Bleed Test described above, expect that the dyed paper test squares are immersed in a 0.5 percent tap water solution of white soap flakes (a mixture of 80 percent sodium soap and 20 percent potassium soap produced from 70 percent tallow and 30 percent coconut oil glyceride blend; "Ivory" brand, Procter and Gamble Co.) at 120° F, instead of water alone.

Bleach Test

This procedure compares the degree to which the color of dyed papers would be discharged in a waste paper recovery operation employing hypochlorite bleach.

A preliminary estimate of bleachability is obtained by placing a drop of hypochlorite bleach, containing 2.5 percent available chlorine, on the dyed paper and allowing it to dry at room temperature. From this test, both rate and degree of bleaching are estimated.

A more accurate test, approximating paper mill procedure, is performed by defibering three grams of dyed paper in 150 ml of distilled water using a kitchen blender. The defibered pulp slurry is placed in a jar and hypochlorite is added to the extend desired, usually 2.5 percent available chlorine based on the weight of the dry fiber. The slurry consisting of pulp and hypochlorite is adjusted to pH 9 with dilute sulfuric acid or dilute aqueous solution of sodium hydroxide and placed in a water bath to maintain the interval in the temperature range of 115° F to 125° F. After the test is started, the jar is loosely capped. At five minute intervals, the cap is tightened and the jar inverted twice to circulate the liquor. The cap is loosened between inversions. After 20 minutes, the pH is checked and, if higher than 7.5, is adjusted thereto. The test is then continued for an additional twenty minutes (with five minutes between inversions). The terminal pH is generally found to be 6.0–6.5. An excess of sodium thiosulfate is added as an antichlor, mixed for 5 minutes and the slurry is diluted to a concentration of approximately 0.3 percent of fiber. Sheets are then prepared at pH 7 without a washing step. Finally, this sheet is pressed and dried in a paper dryer. Control dyeings at specific levels can then be made to accurately determine the loss of strength of color on bleaching.

EXAMPLE 3

To a mixture of 430 g of the copper phthalocyanine having an average per molecule of approximately four aminomethyl substituents, approximately one phthalimidomethyl substituent, approximately 0.2 sulfonic acid substituent and approximately one complexed hydrochloric acid molecule obtained in Example 1, part B above and 1 liter of water, there was slowly added with stirring 28 ml of 37 percent concentrated hydrochloric acid. After approximately two hours of stirring at room temperature, the resulting mixture had a pH of 1.35 and an additional 27 ml of 37 percent hydrochloric acid was added to lower the pH to 0.8. The resultant solution was stirred overnight at ambient temperature and there was then added 2 liters of isopropyl alcohol to precipitate the acid-addition salt. The blue solid was collected by filtration, washed with one liter of fresh isopropyl alcohol and then dried in vacuo at 35° C to obtain the hydrochloric acid addition salt of predominately tetra(aminomethylated) copper phthalocyanine. Elemental analyses established that this product has an average per molecule of approximately four aminomethyl substituents, approximately one phthalimidomethyl substituent, approximately 0.2 sulfonic acid substituent and approximately four complexed hydrochloric acid molecules. The visible absorption spectrum of an aqueous solution of this dyestuff containing 0.025 g of dye per liter of solution showed a maximum at 626 millimicrons, A = 1.2495.

EXAMPLE 4

To a stirred solution of 120.0 ml of water and 9.0 ml of ethylene glycol in a beaker at 25° C, there was gradually added 44.2 g of the tetrahydrochloride addition salt of predominately tetra(aminomethylated) copper phthalocyanine obtained in Example 3 above. After stirring for approximately 32 hours, the resulting deep blue solution was assayed by spectrophotometric means and found to contain 29.8 percent by weight of the entire composition of the dissolved dye constituent. The concentrated dye solution thus obtained was diluted with water to a final dye constituent of 25.6 percent by weight of the entire composition. The viscosity of this concentrated solution measured at 25° C on a Brookfield Model LVT viscometer with a number three spindle at 30 revolutions per minute was 60 centipoises. A portion of the solution was then concentrated by evaporation to a dye constituent content of 34.1 percent. This concentrate had a viscosity of 1640 centipoises.

The storage-stability of the concentrated dye solution obtained directly above was evaluated by comparing its initial viscosity with that obtained after subjecting the solution to five temperature variation cycles wherein each cycle consisted of placing the solution in a closed container in a hot-air oven at 120° F for a period of sixteen hours and then setting the solution aside at room temperature (72°–77° F) for 8 hours. Each cycle approximates storage of the concentrated solution at 75° F for a period of 22 days. After five cycles, which approximates almost four months of ordinary storage conditions, the concentrated solution had a viscosity of 2420 centipoises.

EXAMPLE 5

To a stirred mixture of 80.0 ml of water, 10.0 g of ethylene glycol and 100.0 g of water-wet pulp containing 38.0 g of copper phthalocyanine having an average per molecule of approximately four aminomethyl substituents, approximately one phthalimidomethyl substituent, approximately 0.2 sulfonic acid substituent and approximately one complexed hydrochloric acid molecule prepared as described in Example 1, part B above, there was added at 25° C, 8.5 g of 95 percent methanesulfonic acid. The solution which resulted was stirred at room temperature for a period of approximately 8 hours. Assay by spectrophotometric means showed that the solution contained 23.6 percent by weight of the entire composition of the dissolved dye constituent. The solution was then concentrated by evaporation with heating and stirring to approximately 88 percent of its original volume which assay showed produced a final concentrated solution containing 25.4 percent by weight of the entire composition as the dye constituent, copper phthalocyanine having an average per molecule of approximately one phthalimidomethyl substituent, approximately four aminomethyl substituents, approximately 0.2 sulfonic acid substituent, approximately one complexed hydrochloric acid molecule and approximately three complexed methanesulfonic acid molecules. The composition thus obtained contained approximately 5.3 percent ethylene glycol and approximately 69.3 percent water, each by weight of the entire composition, and had a viscosity of 55 centipoises at 25° C when measured on a Brookfield Model LVT viscometer using a number two spindle at 30 revolutions per minute. Paper dyed with aqueous dilutions of this solution had a turquoise shade and was found to be highly bleachable. The dye did not bleed in the water-bleed test and bled only very slightly in the soap-bleed test.

EXAMPLE 6

A. By substituting zinc phthalocyanine for copper phthalocyanine in interaction with phthalimide and paraformaldehyde in 100 percent sulfuric acid plus oleum according to the procedure described in U.S. Pat. No. 2,761,868, there was obtained zinc phthalocyanine having an average per molecule of approximately five phthalimidomethyl groups.

B. To a stirred slurry of 97.0 g of the thus obtained penta(phthalimidomethyl) zinc phthalocyanine in 700 ml of water at 25° C, there was added 20 ml of 50 percent aqueous solution of sodium hydroxide. The temperature of the mixture was gradually raised to 60° C at which point the pH was 8.6. The pH was adjusted to 10.8 by the addition of a small additional amount of 50 percent aqueous sodium hydroxide solution and the resultant solution heated to 87° and held at that temperature for thirty minutes. In a separate flask, a mixture of 160 ml of concentrated hydrochloric acid and 200 ml of water was heated to refluxing temperature. The alkaline solution was then poured into the hot acid solution at such a rate as to maintain the temperature above 95° C. After the addition was complete, the mixture was heated at reflux for 1 hour and was then cooled to ambient temperature with stirring. Then the pH was gradually adjusted from an initial pH of 0.1 to pH 6.8 by the dropwise addition of concentrated ammonium hydroxide. The mixture was stirred for thirty minutes longer and the suspended solid collected by filtration. The presscake was washed with 1 liter of one percent aqueous sodium chloride solution. The resulting damp presscake of zinc phthalocyanine having an average per molecule of approximately one phthalimidomethyl substituent, approximately four aminomethyl substituents, approximately 0.2 sulfonic acid substituent and approximately one complexed hydrochloric acid molecule weighed 118.5 g.

C. To a stirred mixture of the water-wet aminomethylated zinc phthalocyanine filter cake obtained in part B above, 60.0 ml of water and 12.0 ml of ethylene glycol there was slowly added dropwise 13.0 ml of 95 percent methanesulfonic acid. After stirring for approximately four hours, the resulting greenish-blue solution had a pH of 0.6 and contained approximately 18.0 percent by weight of the entire composition of zinc phthalocyanine having an average per molecule of approximately one phthalimidomethyl substituent, approximately four aminomethyl substituents, approximately 0.2 sulfonic acid substituent, approximately one complexed hydrochloric acid molecule and approximately three complexed methanesulfonic acid molecules. The composition contained approximately 6 percent ethylene glycol and approximately 76 percent water, each by weight of the entire composition. The visible absorption spectrum of an aqueous solution containing 0.022 g of the dye constituent of this composition showed two maxima in the visible absorption spectrum at 631 and 677 millimicrons, A = 0.964 and 1.311, respectively. Paper dyed with aqueous dilutions of this dye composition had a green-turquoise shade.

EXAMPLE 7

Proceeding in a manner similar to that described in Example 5 hereinabove, except that diethylene glycol monoethyl ether was substituted for ethylene glycol, there was obtained a concentrated dye solution containing 24.5 percent by weight of the entire composition of the dye constituent, copper phthalocyanine having an average per molecule of approximately one phthalimidomethyl substituent, approximately four aminomethyl substituents, approximately 0.2 sulfonic acid substituent, approximately one complexed hydrochloric acid molecule and approximately three complexed methanesulfonic acid molecules. The composition contained approximately 5.3 percent of diethylene glycol monoethyl ether and approximately 70.2 percent of water, each by weight of the entire composition, and had a viscosity of 50 centipoises at 25° C when measured on a Brookfield Model LVT viscometer with a number three spindle at 30 revolutions per minute.

Papers dyed with aqueous dilutions of this composition had a turquoise shade and were highly bleachable. The papers were found to have no bleed in the water-bleed test and to bleed only slightly in the soap-bleed test.

EXAMPLE 8

A. By substituting tetra(o-carboxybenzamidomethyl) cobalt phthalocyanine prepared according to the procedure described in U.S. Pat. No. 2,761,868 for penta(phthalimidomethyl) copper phthalocyanine in a hydrolysis procedure similar to that described in Example 1, part B above, there is obtained cobalt phthalocyanine having an average per molecule of approximately four aminomethyl substituents, approximately 0.2 sulfonic acid substituent and approximately one complexed hydrochloric acid molecule.

B. By substituting the predominately tetra(aminomethylated) cobalt phthalocyanine obtained as described in part A directly above for predominately aminomethylated copper phthalocyanine and propylene glycol for ethylene glycol in the procedure of Example 5 above, there is obtained a concentrated aqueous dye solution containing approximately 25 percent by weight of the entire composition as the dye constituent, cobalt phthalocyanine having an average per molecule of approximately four aminomethyl substituents, approximately 0.2 sulfonic acid substituent, approximately one complexed hydrochloric acid molecule and approximately three complexed methanesulfonic acid molecules. The composition which is obtained also contains approximately 5.5 percent propylene glycol and approximately 69.5 percent water, each by weight of the entire composition.

EXAMPLE 9

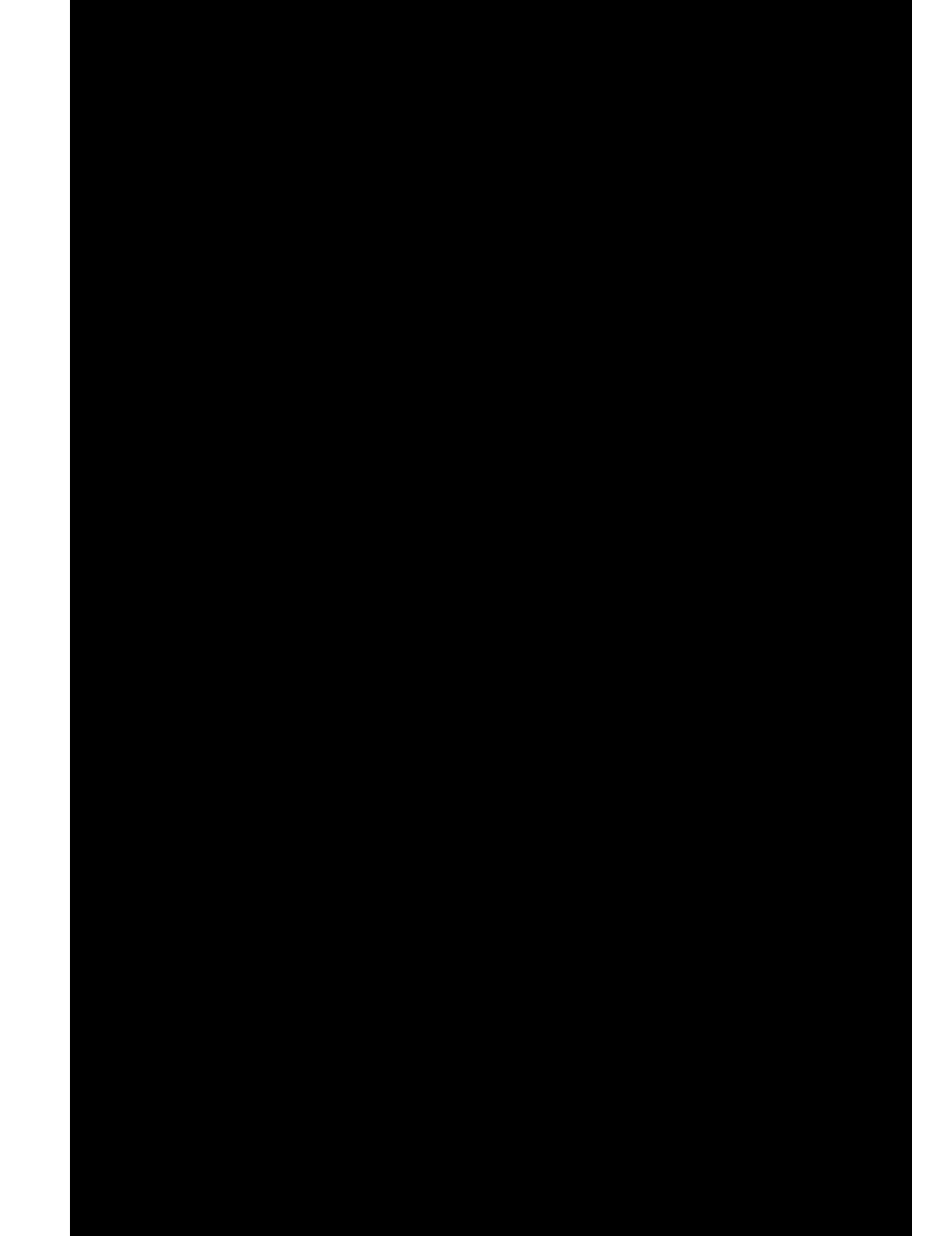

A. To a stirred slurry of 120 g of penta(phthalimidomethyl) copper phthalocyanine in 480 ml of water at 25° C, there was added 20 ml of 50 percent aqueous solution of sodium hydroxide. The temperature was gradually raised to 70° C at which point the pH was 9.7. The pH was adjusted to 11.0 by the addition of a small additional amount of 50 percent aqueous sodium hydroxide solution heated to 90° C and held at that temperature for one hour. In a separate flask, a mixture of 174 g of 95 percent methanesulfonic acid and 260 ml of water was heated to refluxing temperature. The alkaline solution was then poured into the hot acid solution at such a rate as to maintain the temperature above 95° C. After the addition was complete, the mixture was heated at reflux for 3 hours and then set aside at ambient temperature overnight. One liter of isoporpyl alcohol was added to the reaction mixture containing suspended